United States Patent

[11] 3,617,089

[72] Inventor Loren E. Tyler
 Wayzata, Minn.
[21] Appl. No. 861,822
[22] Filed Sept. 29, 1969
[45] Patented Nov. 2, 1971
[73] Assignee Letco, Inc.
 Long Lake, Minn.

[54] COVER MEANS FOR AGRICULTURAL TRANSPORT DEVICES
 12 Claims, 6 Drawing Figs.

[52] U.S. Cl. .................................................... 296/137 B
[51] Int. Cl. ................................................... B62d 25/00
[50] Field of Search............................................ 280/5;
 296/15, 100, 137; 220/30, 31 SR

[56] References Cited
 UNITED STATES PATENTS

| | | | |
|---|---|---|---|
| 3,009,426 | 11/1961 | Nampa.......................... | 296/100 X |
| 3,420,570 | 1/1969 | Kunz............................ | 296/100 |
| 3,450,431 | 6/1969 | Tyler............................ | 296/100 |
| 3,485,524 | 12/1969 | Nelson ......................... | 296/100 |
| 3,508,787 | 4/1970 | Strong et al................... | 296/100 |

Primary Examiner—Benjamin Hersh
Assistant Examiner—Winston H. Douglas
Attorneys—Donald R. Sjostrom and Robert P. White ABSTRACT: An agricultural transport device such as a fertilizer spreader having a relatively large hopper with a top with a large rectangular opening therein and a pair of cooperating door members hinged to the hopper and closable to cover the opening in the hopper. The doors are formed of a lightweight material such as molded fiber glass and have a plurality of spaced, longitudinally extending, stiffening ribs extending in a direction generally normal to the hinged edges thereof. Cooperating shock absorbing bumpers are mounted on the hopper and positioned to be engaged by the door when it is opened and these bumpers are disposed so as to be engaged by the ribs of the door which constitutes the portions of greatest strength thereof. The doors are arched so that the greatest height thereof is substantially at the center of each door and one of the ribs extends therethrough with the remainder of the ribs spaced on either side thereof. The bumpers are disposed for cooperation with these ribs and the bumper cooperable with the center rib has a height somewhat less than the height of the bumpers cooperating with other ribs so that the bumpers define a contour substantially equal to the contour defined by the ribs of the door to substantially equally distribute the shock when the door is thrown open against the bumpers.

INVENTOR.
LOREN E. TYLER
BY Donald R. Sjostrom
HIS ATTORNEY

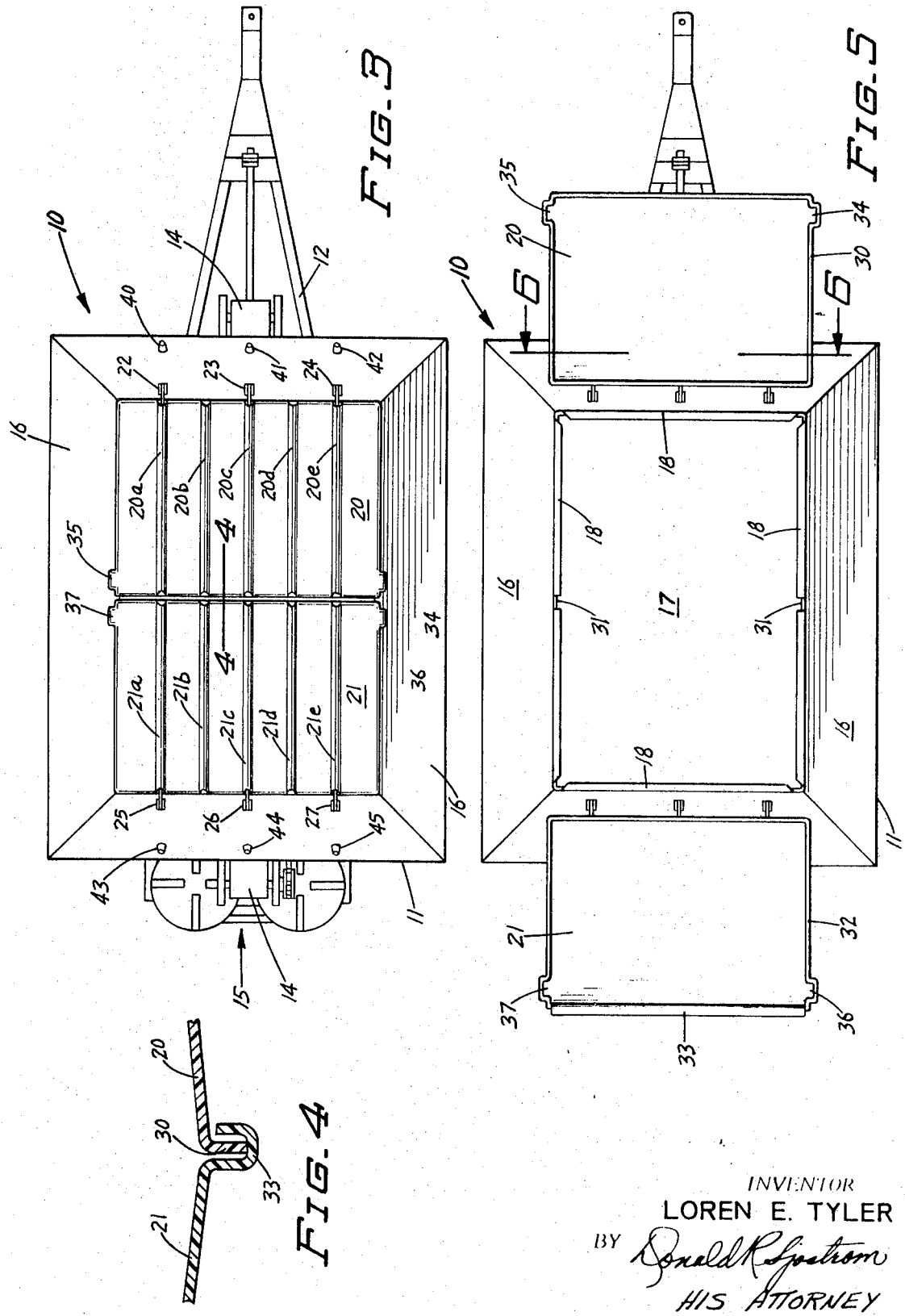

COVER MEANS FOR AGRICULTURAL TRANSPORT DEVICES

BACKGROUND OF THE INVENTION

Agricultural transport devices such as large fertilizer spreaders capable of hauling several tons of material are generally built with a relatively large hopper with a large opening at the top thereof to readily facilitate filling the hopper. Generally it is desirable to cover the opening at times other than when it is being filled to prevent exposure of the material to wind and rain and especially to prevent the material from being blown out of the hopper if the unit is to be towed at relatively high speeds. Various types of covers have been proposed, the most common being simply to throw a tarp or the like over the top of the hopper after it has been filled and somehow tying it down. A simple and often very satisfactory type of cover is that disclosed in the applicant's copending application entitled "Cover Means For Agricultural Transport Devices" which discloses a tarp or the like which is secured to the hopper at the forward end of the opening and which has elastic fastening means cooperable with hooks on the hopper to releasably secure the cover. At the rear of the machine a rigid member is secured to the cover and it has a plurality of elastic fastening members which also cooperate with hooks on the hopper. This assures that the tarp is always conveniently at hand and can be quickly and easily spread over the opening and fastened down by one person even under rather windy conditions and can be quickly rolled forward and tied so as to be stored in this convenient position.

In many instances a more substantial cover than that provided by any type of tarp is desired. The applicant's recently issued U.S. Pat. No. 3,450,431 is directed to an agricultural transport device which has a pair of rigid doors to cover the opening in the hopper. The doors disclosed therein were formed from metal, and although it was indicated that fiber glass doors also may be used, the doors disclosed were relatively large heavy doors with internal bracing to add strength. It has been found that when lighter doors are desired, such as by forming them from fiber glass, there may be difficulty in obtaining the required rigidity and strength, particularly when it is realized that these doors are normally opened by throwing them open against bumpers which are mounted on the hopper.

BRIEF SUMMARY OF THE INVENTION

This invention provides an improved cover means for an agricultural transport device such as a fertilizer spreader and is considered to be an improvement upon the applicant's invention which is the subject of U.S. Pat. No. 3,450,431. Specifically, it provides a construction for a cover for agricultural transport devices such as fertilizer spreaders wherein the door can be formed of relatively lightweight material and with a relatively thin cross section. A plurality of stiffening ribs extend across the door and the bumpers which the door engages when it is opened are disposed so that they are engaged each by one of the stiffening ribs. Preferably the relative heights of these bumpers are such that they conform to the contour of the door which will engage them so that the shock is substantially uniformly distributed when the door is thrown open against them.

In the preferred arrangement two doors, one hinged at each end of the opening in the hopper, are utilized and they have their ribs extending longitudinally and in alignment so that the ribs are substantially continuous from one end of the hopper to the other when the doors are closed. Each of the doors has at least one outwardly extending portion which is readily accessible when the door is either opened or closed and which provides a handle which can be easily grasped by a human operator to flip the door open or closed and which also is designed so that it can be engaged by a pole or stick so that the operator can flip the door open in this manner while standing on the ground beside the machine.

The improved structure provides closure means which are relatively rigid and which will withstand continued hard use including the relatively high impact encountered when doors are flipped or thrown open and closed. The doors are strong enough so they require no center or cross supports on the hopper to support them. Thus, the opening in the hopper is completely unobstructed when the doors are open so that the hopper can be easily filled either with a bucket loader or an elevator chute. The stiffening ribs, located on the exterior of the door, not only add to the strength and rigidity of the doors but also add to the appearance of the doors giving them a rather streamlined appearance.

An object of the invention is to provide an improved cover means for an agricultural transport device such as a fertilizer spreader.

Another object is to provide cover means comprising a pair of doors which are formed of relatively lightweight material and with relatively thin cross section but which will have sufficient rigidity and strength to withstand continuous hard use and impact.

Another object of the invention is to provide a cover means as aforesaid wherein the doors are hinged at opposite edges of the opening and are of sufficient strength so there need be no center supports or the like so that the opening is completely unobstructed when the doors are open.

Another object of the invention is to provide a cover structure including a pair of doors as aforesaid which utilize a plurality of longitudinally extending ribs to add strength and rigidity to the doors and which at the same time add to the pleasing appearance of the machine.

Still another object of the invention is to provide, in a fertilizer spreader or the like, a pair of doors as described above and cooperating shock absorbing bumpers on the spreader to be engaged by the doors when they are thrown open and with these bumpers disposed so that they are engaged by the ribs on the doors.

Still another object of the invention is to provide, in a fertilizer spreader or the like as described in the last object, an arrangement wherein the bumpers have relative heights so as to define a contour substantially identical to the contour defined by a line extending through the ribs which engage said bumpers.

These and other objects of the invention will become apparent upon reading the detailed description which follows.

DESCRIPTION OF THE DRAWING

FIG. 3 is a top view of the fertilizer spreader as seen from the top of FIG. 1.

FIG. 4 is a fragmentary cross sectional view taken generally along line 4—4 in FIG. 3 and disclosing cooperating flanges on the doors on the fertilizer spreader.

FIG. 5 is a top view, generally similar to FIG. 3 but with the doors which constitute the cover for the fertilizer spreader disclosed in their open positions.

DETAILED DESCRIPTION

Figure 1:
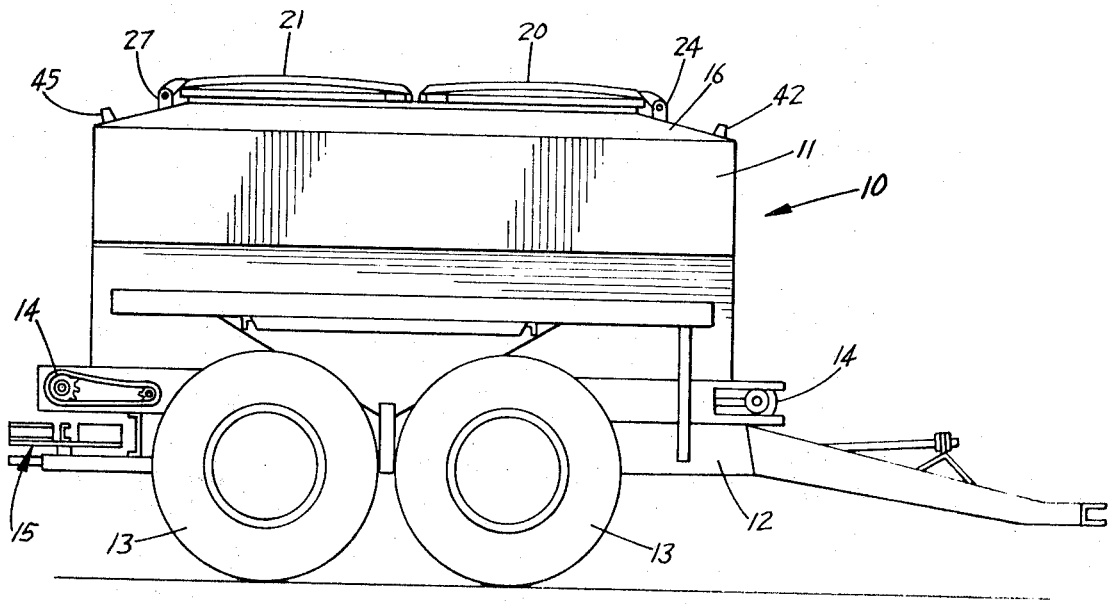
FIG. 1 is a side view of a fertilizer spreader utilizing the cover means of this invention.
Figure 2:
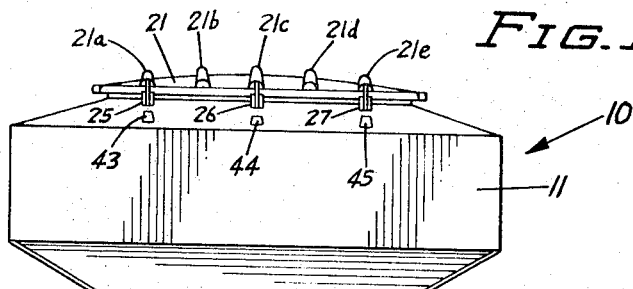
FIG. 2 is an end view, as seen from the left of FIG. 1, of the fertilizer spreader.
Figure 6:
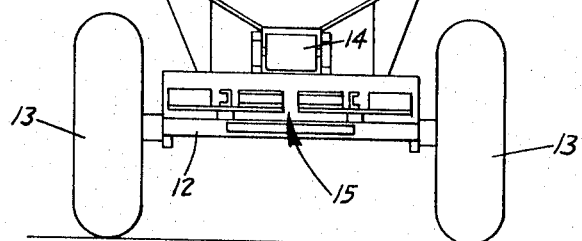
FIG. 6 is a fragmentary cross sectional view taken generally along line 6—6 of FIG. 5.

Referring to the drawing, reference numeral 10 designates a fertilizer spreader having a tank or hopper 11 mounted on a frame 12 which is provided with a plurality of wheels 13 and which is adapted to be connected to a truck or tractor for towing. A hopper of this type may also be mounted directly on the bed of a truck if desired. An appropriate conveyor 14 is disposed at the bottom of the hopper for moving materials to the rear of the machine where it is spread by a distributor apparatus generally designated by the numeral 15. The conveyor can be seen only slightly at the front and rear of the machine. Preferably hopper 11 is a generally rectangular tank with a tapered bottom which feeds the material down to the conveyor 14. At the top hopper 11 has a generally flat top surface which may be tapered or pyramided at its edges to provide a sloped surface 16. In the top surface there is provided a relatively large, generally rectangular opening 17 through which material may be placed into the hopper. A flange 18 extends substantially all of the way around this opening and provides a smooth edge around the opening as well as adding strength and rigidity to the hopper. Hingedly mounted on surface 16 at either end of the hopper are a pair of doors 20 and 21 at the front and rear of the machine, respectively. These two doors are substantially identical except for one feature which will be described hereinafter. Each of the doors is formed of a relatively lightweight material such as molded fiber glass and has a relatively thin cross section. This cross section can be seen best in FIG. 6, and as seen therein, it is relatively thin but has a plurality of longitudinally extending ribs on the upper surface and these ribs are generally solid so that they have a substantially greater cross section than the main portion of the door. These ribs extend generally parallel to each other and are spaced across the top of the door. By way of example the doors in the preferred embodiment have 5 ribs. These have been designated in door 20 by numerals 20a, 20b, 20c, 20d and 20e. Similarly, door 21 has 5 ribs designated by numerals 21a through 21e. Door 20 is hinged to the front of the hopper, outside of opening 17, by means of hinge members which include extending members molded directly into the ends of ribs 20a, 20c and 20e. These cooperate with hinge members welded onto the hopper to provide hinges 22, 23 and 24, respectively. Similarly, door 21 has hinge members extending from the rear ends of ribs 21a, 21c and 21e and these cooperate with hinge members welded onto surface 16 at the rear of opening 17 to provide hinges 25, 26 and 27.

Door 20 has a downwardly extending flange 30 extending all of the way around its periphery. When it is closed, door 20 overlies the forward half of opening 17 and flange 18 and flange 30 encloses the forward portion of flange 18 to provide a relatively weathertight closure. At approximately the longitudinal center of the hopper, flange 18 has a section 31 removed on each side of the opening. This permits flange 30 on door 20 (and as will be seen, a cooperating flange on door 21) to extend down into this opening so that the doors can be completely closed, thus enclosing flange 18. Door 21 has a downwardly extending flange 32 which extends around the rear and both sides of the door. At its forward edge it has a generally U-shaped or channel portion 33 which, when the door is closed, extends down into openings 31 in flange 18. When door 20 is closed over door 21 the rear portion of flange 30 extends into the open channel of portion 33. It will be appreciated that the doors are of sufficient width so that channel 33 extends out beyond flange 18 on both sides of the hopper thus precluding any rain from entering at the notches 31. The cooperation between flange 30 and channel 33 can best be seen in FIG. 4 which is a fragmentary cross section showing the doors in closed position.

Door 20 is formed with extending portions 34 and 35 near its rear edge on opposite sides of the door. Flange 30 simply extends outward around these portions, thus following the periphery of the door around these portions. Similarly, door 21 has outwardly extending portions 36 and 37 at opposite sides and generally adjacent its forward end. Flange 32 also extends outward and follows the periphery around these portions. The portions 34, 35, 36 and 37 provide convenient handles which may be grasped by a human operator in order to manipulate the doors from open to closed or from closed to open positions. Also, he may simply utilize a pole or stick which can be placed inside of the flange and thus push the doors from open to closed position in this manner. It will be noted that these portions extend outward so that they are readily accessible even when the doors are closed. It will also be appreciated that generally a man standing on the ground will not be tall enough to grasp these handles with his hand and it is often desirable to use a pole for this purpose.

As indicated, the doors are preferably formed of a relatively thin and lightweight material such as fiber glass. As also indicated, it is customary to simply throw these doors open and closed and when they are thrown open there is a substantial impact shock as they engage the surface of the hopper. It is customary to cushion this shock with some type of rubber or other resilient bumpers. In the embodiment disclosed, 3 bumpers are provided at each end, the forward end having bumpers 40, 41 and 42 and the rear having bumpers 43, 44 and 45 spaced thereacross. In order to take advantage of the fact that the greatest strength in the doors is at the relatively thick cross section provided by the ribs, bumpers 40, 41 and 42 are disposed so that they will be engaged by ribs 20a, 20c and 20e, respectively. Similarly, bumpers 43, 44 and 45 are spaced and disposed so that they will be engaged by ribs 21a, 21c and 21e, respectively. In the preferred arrangement, the doors are arched so that the highest point in each one of them (when they are closed) is substantially at the center of the door. Thus, the center rib is of a somewhat greater height than the outside ribs in each of the doors and consequently, when the door is opened, the center rib extends somewhat lower than do the outer ribs (see especially FIG. 6). In order to assure that the shock will be substantially uniformly distributed when the door is thrown open against the bumpers, the center bumpers, in this case bumpers 41 and 44, are made somewhat shorter than are the outside bumpers on either side of them. Thus, they are formed so as to generally follow the contour of a line through the three ribs at the point where the ribs will engage these bumpers.

As can best be seen in FIG. 5, there are no supports obstructing opening 17 when the doors are open. Although such supports have often been used in previous types of covers, they interfere with loading the hopper and are thus undesirable. The present doors have sufficient strength so they do not require such supports. As can best be seen in FIG. 3, the doors are disposed so that these ribs extend longitudinally and so that they are generally continuous in appearance from front to rear. In other words, ribs 20a and 21a are substantially aligned as are each of the other corresponding ribs in doors 20 and 21. This provides a very clean and pleasing appearance and also gives a relatively streamlined surface. It will be appreciated that the fact that door 20 overlaps door 21 tends to keep the doors closed because wind rushing over the top of door 20 urges it downward when the vehicle is being towed.

The structure described provides a simple cover means for an agricultural transport device such as a fertilizer spreader. The doors described provide a good weathertight cover and yet are relatively lightweight and easy to handle. The ribs add substantial strength and at the same time add to the appearance of the vehicle. The bumpers are disposed so that they engage the ribs thus taking advantage of the points of maximum strength of the doors. The handles are provided as an integral part of the door also adding both to the convenience and the appearance of the device. It will be appreciated that various modifications may be apparent in view of the disclosure herein and that this disclosure is made by way of example only and not of limitation.

The embodiments of the invention in which an exclusive property or right is claimed are defined as follows:

1. In combination: an agricultural transport device of the type having a relatively large hopper for containing a quantity of loose material, the hopper having a top wall with a relatively large opening therein, cover means for closing said opening in the top wall of said hopper, said cover means having at least one door member movable between an open position and a closed position wherein it overlies at least a portion of the opening in the top wall of said hopper: mounting means movably mounting the door member on the hopper, said door member including a plurality of longitudinally extending stiffening and strengthening ribs on the upper side thereof, said door member having a relatively thin cross section with areas of greatest cross section being the ribs; a plurality of shock absorbing bumpers mounted on the hopper and disposed so as to be engaged by the door member when it is in the open position, said bumpers each being disposed for engagement with one of said longitudinally extending ribs when said door is in the open position, said mounting means having a first member connected to an end portion of a rib and a second member connected to the hopper, said first member being pivotally connected to the second member.

2. The combination of claim 1 wherein said longitudinal ribs extend generally parallel to each other and in a direction generally normal to the mounted side of the door member; and said shock absorbing bumpers are disposed on the top wall of said hopper spaced from and generally parallel to the mounted edge of the door member.

3. The combination of claim 1 wherein the door member is one-piece member constructed of a relatively lightweight material.

4. The combination of claim 1 wherein the opening in the top wall of the hopper is a substantially rectangular opening and the cover means comprises a pair of substantially identical door members, said door members having portions overlapping substantially at the center of the opening when they are closed; the ribs in said door members being substantially aligned so as to be generally continuous from one door member to the other when said door members are closed; said mounting means comprising at least one hinge connected to one door member and the hopper on one side of the opening and at least one hinge connected to the other door member and the hopper on the opposite side of the opening.

5. The combination of claim 4 wherein: said door members open in opposite directions and generally back against said hopper; said hopper has no cross supports for said door members across said opening; and said opening is unobstructed when said door members are open.

6. The combination of claim 1 wherein said door member has an outwardly extending portion substantially spaced from the mounting means which is readily accessible for grasping by a human operator or for engagement with a pole or the like when the door member is in either its closed or open position so that the door member can be readily manipulated from closed to open position.

7. The combination of claim 1 wherein said door member has at least one generally straight edge along which it is mounted on the hopper; said ribs extend generally normal to said straight edge; said door member is arched whereby its highest portion is substantially at its center; a center rib extends generally through the highest portion of said arched door member and at least one rib is spaced from and generally parallel thereto on each side of said center rib; said shock absorbing bumpers are disposed on the top wall of the hopper in a position to be engaged by said ribs when said door member is in the open position; and the center one of said bumpers is of lesser height than the other two of said bumpers whereby said bumpers together conform generally to the contour of a line through the ribs at the points where they engage said bumpers so that the shock will be distributed generally evenly when the door member is dropped to its open position.

8. The combination of claim 7 wherein said door member is constructed of a relatively lightweight material such as molded fiber glass.

9. The combination of claim 1 wherein: the door member is self supporting across the opening in said hopper; said hopper has no support members for said door member across said opening; and said opening is unobstructed when said door member is open.

10. The combination of claim 1 wherein the first member of the mounting means is molded into the end portion of the rib.

11. The combination of claim 1 wherein the mounting means comprise a plurality of hinges, each hinge having a first member connected to a rib and a second member secured to the top wall, and means pivotally connecting the first member with the second member, each of said hinges being longitudinally aligned with a rib.

12. The combination of claim 11 wherein the first member of each hinge is molded into an end portion of a rib.

* * * * *